United States Patent
He

(10) Patent No.: US 7,384,074 B2
(45) Date of Patent: Jun. 10, 2008

(54) PRESS-FITTING

(75) Inventor: Zanbu He, Guangdong Province (CN)

(73) Assignee: Foshan Rifeng Enterprise Co., Ltd., Foshan, Guangdong Province (CN)

( * ) Notice: Subject to any disclaimer, the term of this patent is extended or adjusted under 35 U.S.C. 154(b) by 0 days.

(21) Appl. No.: 11/704,059

(22) Filed: Feb. 7, 2007

(65) Prior Publication Data

US 2008/0067809 A1    Mar. 20, 2008

(30) Foreign Application Priority Data

Sep. 14, 2006   (CN) .................. 2006 2 0064198 U

(51) Int. Cl.
    *F16L 33/207*   (2006.01)
(52) U.S. Cl. .................. 285/256; 285/242; 285/259
(58) Field of Classification Search ................ 285/242, 285/256, 29, 259; 29/508
    See application file for complete search history.

(56) References Cited

U.S. PATENT DOCUMENTS

| 4,544,187 | A | * | 10/1985 | Smith | .................. 285/256 |
| 5,984,376 | A | * | 11/1999 | Lampe | .................. 285/256 |
| 6,145,892 | A | * | 11/2000 | Weber | .................. 285/259 |
| 6,450,549 | B1 | * | 9/2002 | Schutz | .................. 285/256 |
| 6,874,823 | B2 | * | 4/2005 | Viegener | .................. 285/256 |
| 7,014,218 | B2 | * | 3/2006 | Fisher et al. | .................. 285/256 |
| 2003/0184087 | A1 | * | 10/2003 | Nishimura et al. | .......... 285/256 |
| 2004/0222632 | A1 | * | 11/2004 | Viegener | .................. 285/256 |
| 2004/0251683 | A1 | * | 12/2004 | Fisher et al. | .................. 285/256 |
| 2005/0161941 | A1 | * | 7/2005 | Poll et al. | .................. 285/93 |
| 2006/0071469 | A1 | * | 4/2006 | Romanelli et al. | .......... 285/256 |
| 2006/0220378 | A1 | * | 10/2006 | Li et al. | .................. 285/242 |

FOREIGN PATENT DOCUMENTS

JP     04296280 A    * 10/1992

* cited by examiner

*Primary Examiner*—James M Hewitt
(74) *Attorney, Agent, or Firm*—Charles E. Baxley

(57) ABSTRACT

A press-fitting includes a body, a jacket, a seal ring and a plastic check ring. The plastic check ring has an annular convex portion, one end of the jacket has an inward wall for clamping with the inner hook, the body has a seal groove and a serrated groove with fillets on its core portion. The seal ring is disposed in the seal groove with the outer diameter of the seal ring being smaller than or equal to the outer diameter of the core portion. The press-fitting according to the present invention is of simple structure, and is convenient and quick to be assembled, and can be inspected, and is safe on seal coupling.

4 Claims, 2 Drawing Sheets

-- Prior Art --

PRESS-FITTING

FIELD OF THE INVENTION

The present invention relates to a press fitting and more particular to a press-fitting for polyethylene/aluminum/polyethylene composite pipe.

BACKGROUND OF THE INVENTION

A pipe fitting, as shown in FIG. 1, is disclosed in German Patent DE202005008109. The pipe fitting comprises a body 11, a jacket 12, a seal ring 13 and a plastic check ring 14, which are clamped to establish the seal joint of polyethylene/aluminum/polyethylene composite pipes. However, the assembly of this type of pipe fitting is of relative high requirements, such as the ends of the pipe 4 needs to be cut even and a full-round action should be performed. An annular convex portion 142 of the plastic check ring 14 forms a close fit with the annular groove 111 on the core of the body 11, therefore the pipe is relative hard to be inserted into the fitting, owing to the fact that the jacket 12 is eccentric to the core of body 11. The pipe should be inserted into the fitting with carefulness, for the outer diameter of seal ring 13 is larger than the core of body 11, or else the seal ring 13 would be pushed out of the core of body 11 easily, which affects the sealing performance greatly. During the clamping process, the end face 141 of plastic check ring 14 is positioned with respect to the clamping tool, thereby, an imprecise positioning that affects clamping result may occur. Meanwhile, the seal ring 13 is of a certain compression after the pipe 4 is inserted into the pipe 4 without being clamped, so that when the hydraulic pressure of pipeline system is checked, leakage would not appear. As a result, a leakage due to worker's neglect of assembly may not be checked out. Once the clamping of the fitting is neglected, a great leakage that leads to unwanted economic loss may occur after a long time.

SUMMARY OF THE INVENTION

The object of the present invention is to provide a press-fitting which is of long-term perfect sealing performance and can be assembled quickly and coupled safely, which overcomes the above-mentioned problems existing in the prior art.

To achieve the above-described object, the present invention provides a press-fitting comprising a body having an annular groove on the rear end of its core portion, a jacket, a seal ring and a plastic check ring having a limit annular convex portion that is fit to the annular groove, wherein said plastic check ring is provided with an annular convex portion and an inner hook extending towards the annular convex portion, one end of said jacket has an inward wall for clamping with the inner hook, said body has a seal groove and a serrated groove with fillets on its core portion, said seal ring is disposed in said seal groove with the outer diameter of the seal ring being smaller than or equal to the outer diameter of the core portion.

For the outer diameter of the seal ring is smaller than or equal to the outer diameter of the core portion and the serrated grooves on the core are of fillets, it is unnecessary to chamfer or fillet the ends of the pipe 4 which will be filleted by the core itself during the inserting operation. Moreover, the seal ring will not be pushed out of the seal groove and damaged, while the inner wall of pipe 4 will not be scratched. If not being clamped, the press-fitting will leak due to the seal ring not being pressed firmly, which makes the assembly convenient and ensures the safe coupling and prevents the leakage caused by neglect. The jacket is connected with the plastic check ring by back clamping, which may be implemented by reconstructing the known jacket in order to minimize the manufacturing costs. Further, the jacket may swing slightly with respect to the core, so that the level of concentricity between the jacket and the core may be auto-adjusted when the pipe is inserted into the core of the press-fitting, which makes the inserting easier and the pressure used relative easy. During the clamping operation, the annular convex portion on the plastic check ring may be locked by the groove on snap ring quickly, and thus the annular convex on the snap ring is correspond to the seal groove of the core, the jacket is forced to radial shrink by the annular convex on the snap ring, the pipe 4 is pressed into the seal groove of the core, and the seal ring is impacted, meanwhile the pipe 4 is engaged with the serrated groove of the core, thereby a safe coupling is obtained.

As an improvement to the present invention, said limit convex portion has an inner diameter lager than the bottom diameter of said annular groove and a width smaller than said annular groove in order that said plastic check ring is fixed to said body in the form that the plastic check ring can be swung without departing from the body. Hence, when the pipe is inserted into the core of the press-fitting, the concentricity between the jacket and the core may further be auto-adjusted, which makes the inserting easier.

Further, the other end of said jacket is trumpet-shaped.

Further, said jacket includes a viewing aperture near the inward wall in order to check whether the pipe 4 is assembled correctly or not.

The press-fitting according to the present invention is of simple structure, and is convenient and quick to be assembled, and can be inspected, and is safe on seal coupling.

Wherein:

11—body, 111—annular groove, 12—jacket, 13—seal ring, 14—plastic check ring, 141—end face, 142—limit annular convex portion, 21—body, 211—seal groove, 212—serrated groove, 213—annular groove, 22—jacket, 221—inward wall, 222—viewing aperture, 23—seal ring, 24—plastic check ring, 241—annular convex portion, 242—limit annular convex portion, 243—inner hook, 31—convex portion, 32—groove, 4—pipe, 5—snap ring.

DESCRIPTION OF PREFERRED EMBODIMENT

The above characteristics and spirit of the present invention will be more clearly understood by the detailed description of the preferred embodiments, with the help of the enclosed drawings.

Figure 1:
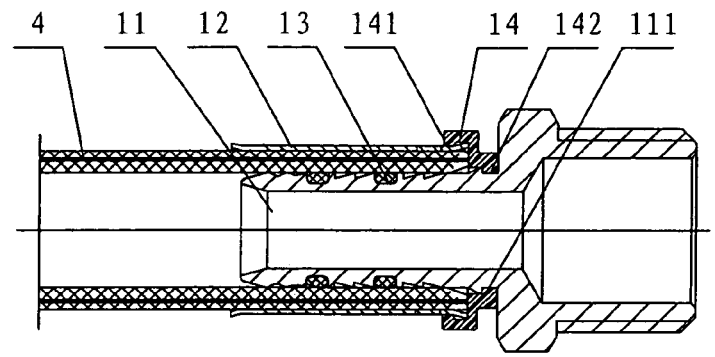
FIG. 1 is a sectional view showing a known press-fitting.
Figure 2:
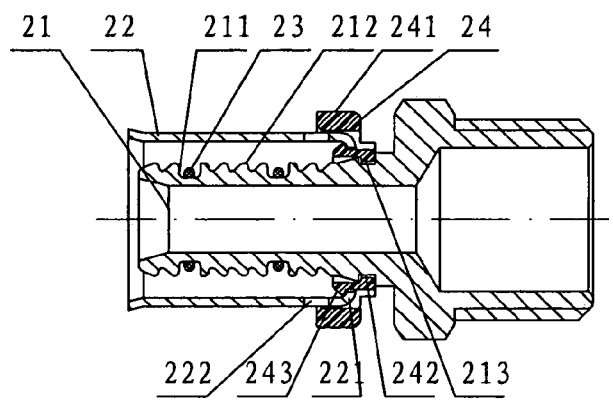
FIG. 2 is a sectional view showing an embodiment of the present invention.
Figure 3:
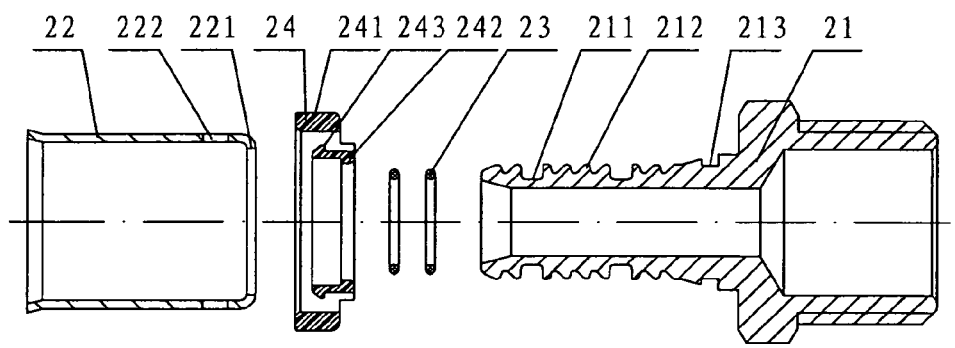
FIG. 3 is an explosive view showing an embodiment of the present invention.
Figure 4:
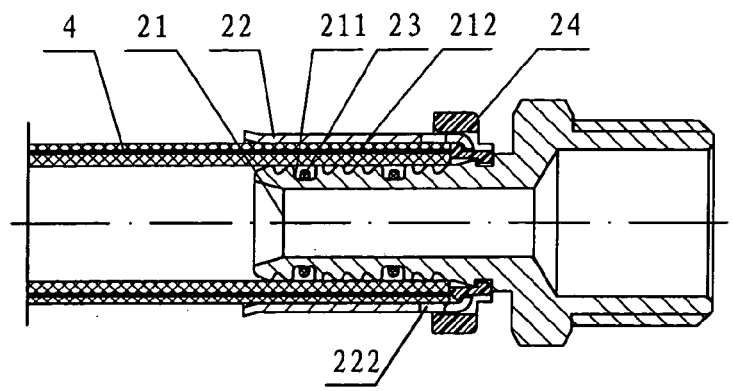
FIG. 4 is a sectional view showing a press-fitting being inserted into the polyethylene/aluminum/polyethylene composite pipe.
Figure 5:
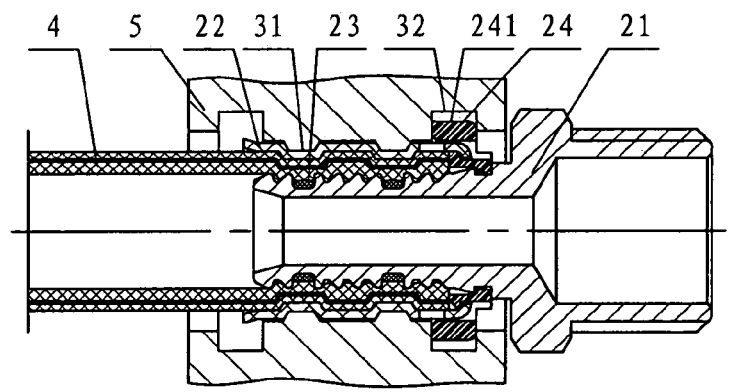
FIG. 5 is a schematic view showing the press-fitting in FIG. 4 being connected with the polyethylene/aluminum/polyethylene composite pipe.
Figure 6:
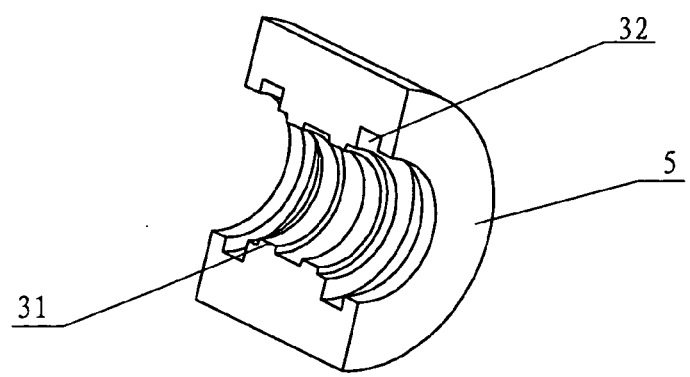
FIG. 6 is a schematic partial view showing the snap ring in FIG. 5.

As shown in FIG. 2-FIG. 5, a press-fitting comprises a body 21, a jacket 22, a seal ring 23 and a plastic check ring 24. The body 21 has two seal groove 211 and a plurality of serrated grooves 212 with fillets. The seal ring 23 is fit to the seal groove 211 with the outer diameter of the seal ring (23) being smaller than or equal to the outer diameter of the core portion.

The plastic check ring 24 comprises an annular convex portion 241, a limit annular convex portion 242 and an inner hook 243. The limit annular convex portion 242 is provided in the annular groove 213 of the rear portion of the core of body 21. The inner diameter of the limit annular convex portion 242 is slightly larger than the bottom diameter of the annular groove 213, while the width is slightly smaller than the width of the annular groove 213. As a result, the plastic check ring 24 is fixed to the body 21 with the form that the plastic check ring 24 can be swung without departing from the body 21, which enables the concentricity between the jacket 22 and the body 11 to be adjustable.

The jacket 22 is provided with an inward wall 221 at one end. The inward wall 221 may be locked with the inner hook 243 of the plastic check ring 24 in order to enable the jacket 22 to swing slightly without departing. The other end of the jacket 22 is trumpet-shaped. Three viewing apertures 222 are provided on the inward wall 221 of the jacket 22.

The snap ring 5 used during the assembly operation is provided with a groove 32 capable to lock with the annular convex portion 241, and two annular convex portions 31 corresponding to the seal grooves 211 on the core of the body 21. The annular convex portions 31 correspond to the seal grooves 211 respectively.

The assembly process between the press-fitting and the polyethylene/aluminum/polyethylene composite pipes is as follow: First, the end of polyethylene/aluminum/polyethylene composite pipe 4 shall be sheared as flat as possible. Then the pipe 4 is inserted into the press-fitting. It can be inspected from the viewing aperture 222 whether the pipe is assembled correctly or not. Whereafter, the press-fitting is hitched by the snap ring 5 on the clamping tool, of which the groove 32 locks the annular convex portion 241 of the plastic check ring 24, in order that the clamping process can be performed. After the clamping operation, the pipe 4 shall be pressed into the seal groove 211 and the serrated groove with fillets 212 of the body 21, and the seal ring 23 is pressed firmly. Accordingly, a sealed connection is obtained.

The present invention may be implemented to the press-fittings for connecting the straight or curved or three-way polyethylene/aluminum/polyethylene composite pipes with one or more ends.

What is claimed is:

1. A press-fitting, comprising:
    a body (21) having a core portion and having an annular groove (213) on the rear end of the core portion;
    a jacket (22);
    a seal ring (23);
    a plastic check ring (24) having a limit annular convex portion (242) that snaps into the annular groove (213);
    wherein:
    said plastic check ring (24) is provided with an annular convex portion (241) and an inner hook (243) extending towards the annular convex portion (241);
    one end of said jacket (22) has an inward wall (221) for clamping with the inner hook (243);
    said body (21) has a seal groove (211) and a serrated groove (212) with fillets on its core portion;
    said seal ring (23) is disposed in said seal groove (211) with the outer diameter of the seal ring (23) being smaller than or equal to the outer diameter of the core portion.

2. The press-fitting of claim 1, wherein said limit convex portion (242) has an inner diameter larger than the bottom diameter of said annular groove (213) and a width smaller than said annular groove (213), said plastic check ring (24) is fixed to said body (21) in the form that said plastic check ring (24) can be swung without departing from the body (21).

3. The press-fitting of claim 1, wherein the other end of said jacket (22) is trumpet-shaped.

4. The press-fitting of claim 3, wherein said jacket (22) includes a viewing aperture (222) near the inward wall (221).

* * * * *